(12) United States Patent
Libin et al.

(10) Patent No.: US 9,674,636 B2
(45) Date of Patent: *Jun. 6, 2017

(54) SYSTEM, METHOD AND COMPUTER SOFTWARE PRODUCT FOR PROVIDING INTERACTIVE DATA USING A MOBILE DEVICE

(75) Inventors: Louis H. Libin, Woodmere, NY (US); Aldo G. Cugnini, Long Valley, NJ (US); Carlo Basile, Hopewell, NJ (US)

(73) Assignee: INTERACTIVE WIRELESS TECHNOLOGIES LLC, Woodmere, NY (US)

(*) Notice: Subject to any disclaimer, the term of this patent is extended or adjusted under 35 U.S.C. 154(b) by 86 days.

This patent is subject to a terminal disclaimer.

(21) Appl. No.: 12/875,026

(22) Filed: Sep. 2, 2010

(65) Prior Publication Data

US 2011/0055874 A1 Mar. 3, 2011

Related U.S. Application Data

(60) Provisional application No. 61/275,829, filed on Sep. 3, 2009.

(51) Int. Cl.
*H04N 21/433* (2011.01)
*H04W 4/00* (2009.01)
(Continued)

(52) U.S. Cl.
CPC ............ *H04W 4/00* (2013.01); *H04N 21/433* (2013.01); *H04N 21/4333* (2013.01);
(Continued)

(58) Field of Classification Search
CPC ............ H04N 21/433; H04N 21/4333; H04N 21/4351; H04N 21/44209; H04N 21/4622
See application file for complete search history.

(56) References Cited

U.S. PATENT DOCUMENTS 5,539,810 A 7/1996 Kennedy, III et al.
5,608,446 A 3/1997 Carr et al.
(Continued)

OTHER PUBLICATIONS

Hybrid Broadcast Broadband TV, ETSI TS 102 796 V1.1.1 (Jun. 2010) Technical Specification, ETSI, 650 Route des Lucioles, F-06921 Sophia Antipolis Cedex—France, © European Telecommunications Standards Institute 2010, © European Broadcasting Union 2010, http://www.etsi.org/deliver/etsi_ts/102700_102799/102796/01.01.01_60/ts_102796v010101p.pdf.

(Continued)

*Primary Examiner* — Robert Hance
(74) *Attorney, Agent, or Firm* — Meagher Emanuel Laks Goldberg & Liao, LLP

(57) ABSTRACT

A method of providing interactive services to a mobile device, comprising: transmitting programming over-the-air to a mobile device by a first facility in communication with a service provider; and receiving by a second facility comprising a wireless access point in communication with the service provider first information based on the programming from the mobile device is provided. A method of providing interactive services to a mobile device, comprising: receiving programming over-the-air by a mobile device from a first facility in communication with a service provider; and transmitting by the mobile device to a second facility comprising a wireless access point in communication with the service provider first information based on the programming is provided.

32 Claims, 16 Drawing Sheets

(51) Int. Cl.
    *H04N 21/435*     (2011.01)
    *H04N 21/442*     (2011.01)
    *H04N 21/462*     (2011.01)
    *H04N 21/414*     (2011.01)

(52) U.S. Cl.
    CPC ... *H04N 21/4351* (2013.01); *H04N 21/44209* (2013.01); *H04N 21/4622* (2013.01); *H04N 21/41407* (2013.01)

(56) References Cited

U.S. PATENT DOCUMENTS

| | | | |
|---|---|---|---|
| 5,826,195 | A | 10/1998 | Westerlage et al. |
| 5,845,074 | A | 12/1998 | Kobata |
| 6,018,657 | A | 1/2000 | Kennedy, III et al. |
| 6,108,537 | A | 8/2000 | Comer et al. |
| 6,141,333 | A | 10/2000 | Chavez, Jr. |
| 6,532,495 | B1 | 3/2003 | Welles, II et al. |
| 6,631,405 | B1 | 10/2003 | Kobata |
| 6,658,663 | B1 | 12/2003 | Bruynsteen |
| 6,742,033 | B1 | 5/2004 | Smith et al. |
| 7,054,740 | B2 | 5/2006 | Chinomi et al. |
| 7,356,304 | B2 | 4/2008 | Zoeckler |
| 7,489,940 | B2 | 2/2009 | Philbin |
| 7,493,078 | B2 | 2/2009 | Perlman |
| 7,720,431 | B2 | 5/2010 | Lee |
| 7,734,803 | B2 | 6/2010 | Laberteaux et al. |
| 7,779,441 | B2 | 8/2010 | Grooters |
| 7,865,306 | B2 | 1/2011 | Mays |
| 7,904,924 | B1 | 3/2011 | de Heer et al. |
| 8,417,267 | B2 | 4/2013 | Philbin |
| 2003/0055924 | A1* | 3/2003 | Matsugatani ........... H04L 29/06 709/220 |
| 2003/0093792 | A1* | 5/2003 | Labeeb ................. H04N 7/163 725/46 |
| 2004/0143652 | A1* | 7/2004 | Grannan ................ H04L 67/04 709/223 |
| 2004/0225425 | A1 | 11/2004 | Kindo et al. |
| 2005/0002354 | A1* | 1/2005 | Kelly ..................... H04L 45/04 370/329 |
| 2005/0055729 | A1 | 3/2005 | Atad et al. |
| 2005/0068915 | A1 | 3/2005 | Atad et al. |
| 2005/0096005 | A1 | 5/2005 | Vinson et al. |
| 2005/0114891 | A1 | 5/2005 | Wasenius |
| 2005/0125533 | A1 | 6/2005 | Svanbro |
| 2005/0136892 | A1 | 6/2005 | Oesterling et al. |
| 2005/0138661 | A1* | 6/2005 | Matsukawa ........... H04H 60/31 725/62 |
| 2005/0251823 | A1 | 11/2005 | Saarikivi |
| 2006/0048196 | A1 | 3/2006 | Yau |
| 2006/0130099 | A1 | 6/2006 | Rooyen |
| 2006/0136905 | A1* | 6/2006 | Thissen .................. H04N 7/16 717/174 |
| 2006/0209768 | A1* | 9/2006 | Yan et al. ......... H04L 29/12311 370/338 |
| 2007/0061844 | A1 | 3/2007 | Hakusui |
| 2007/0067808 | A1 | 3/2007 | DaCosta |
| 2007/0112935 | A1* | 5/2007 | Espelien ............ H04N 5/44582 709/217 |
| 2007/0207813 | A1 | 9/2007 | Fourquin et al. |
| 2007/0250636 | A1 | 10/2007 | Stephens |
| 2007/0261081 | A1 | 11/2007 | Nilsson et al. |
| 2007/0280477 | A1 | 12/2007 | Norin et al. |
| 2007/0281605 | A1 | 12/2007 | Norin et al. |
| 2007/0281610 | A1 | 12/2007 | Norin et al. |
| 2007/0286138 | A1 | 12/2007 | Kaftan |
| 2007/0288543 | A1* | 12/2007 | Evans ............... H04M 1/72563 709/200 |
| 2008/0081640 | A1* | 4/2008 | Tran .................... H04N 5/44543 455/456.3 |
| 2008/0089298 | A1* | 4/2008 | Anschutz ............. H04W 8/005 370/338 |
| 2008/0119131 | A1* | 5/2008 | Rao ........................ G06Q 30/02 455/3.04 |
| 2008/0167031 | A1 | 7/2008 | Sorber et al. |
| 2008/0192736 | A1 | 8/2008 | Jabri |
| 2008/0250441 | A1 | 10/2008 | Sharma |
| 2010/0037260 | A1* | 2/2010 | Fukuda ................ H04N 5/4403 725/39 |
| 2010/0223359 | A1* | 9/2010 | Runstedler ............. H04W 4/08 709/219 |
| 2010/0272419 | A1* | 10/2010 | Wang .................. G11B 27/105 386/248 |
| 2010/0323715 | A1* | 12/2010 | Winters ................ G01S 5/0027 455/456.1 |
| 2011/0055874 | A1 | 3/2011 | Libin et al. |
| 2011/0113463 | A1 | 5/2011 | Wong |

OTHER PUBLICATIONS

Digital TV Brochure, ASTRA and SIRIUS: Europe's leading DTH and digital TV platform, Version 5-2 MByte, Reference nr.: ASTRA 0301-0908 EN, May 5, 2010, http://www.ses-astra.com/business/en/support/document-library/products-services/media/index.php.

Mike Hartl, Christian Rauch, Claus Sattler, Alfred Baier, Trial of a Hybrid DVB-H / GSM Mobile Broadcast System, 14th IST Mobile & Wireless Communications Summit, Dresden Jun. 19-23, 2005, Session: Broadcast Systems & Convergence: Monday, Jun. 20, 2005, 16:00-17:30, http://www.eurasip.org/Proceedings/Ext/IST05/papers/521.pdf.

Digital Video Broadcasting (DVB); Interactive channel through the General Packet Radio System (GPRS), DVB Document A073, rev. 1, Jul. 2004.

Sanaz Fallahkhair, Media convergence: An architecture for iTV and mobile phone based interactive language learning, EuroiTV 2004, Mar. 31-Apr. 2, 2004.

Khairul Hazim, Lotje, Quuxplusone, Satbuff, 2 anonymous edits, ASTRA Platform Services Source: http://en.wikipedia.org/w/index.php?oldid=355685774.

RTAG01: Technical Specification, v0.6.1 (Jun. 15, 2009), pp. 1-25, http://radiodns.org/.

REPG01: Technical Specification, v0.6.1 (Jun. 15, 2009), pp. 1-11, http://radiodns.org/.

RVIS01: Technical Specifications, v0.6.1 (Jun. 15, 2009), pp. 1-12, http://radiodns.org/.

RDNS01Technical Specification, v0.6.1 (Jun. 15, 2009), pp. 1-12, http://radiodns.org/.

RDNS03 Potential applications and use cases, v0.6 (Sep. 29, 2008), pp. 1-5, http://radiodns.org/.

Hartl, et al. "Trial of a Hybrid DVB-H/GSM Mobile Broadcast System" 14th IST Mobile and Wireless Communications Summit, Dresden, Jun. 2005.

Digital Video Broadcasting (DVB) "Interactive Channel through the General Packet Radio System (GPRS)" DVB document A073, Rev. 1, (Jul. 2014).

Fallahkhair, S. "Media Convergence: An Architecture for iTV and Mobile Phone Based Interactive Language Learning" EuroiTV (2004).

Hazim, et al. "Astra Platform Services" Wikipedia: http://en.wikipedia.org/w/index.php?oldid=355685774.

\* cited by examiner

SYSTEM, METHOD AND COMPUTER SOFTWARE PRODUCT FOR PROVIDING INTERACTIVE DATA USING A MOBILE DEVICE

CROSS REFERENCE TO RELATED APPLICATION

This application claims the benefit of U.S. Provisional Patent Application No. 61/275,829, filed Sep. 3, 2009, and entitled System and Method for Providing Interactive Data Using a Mobile Video Device, the entire disclosure of which is incorporated herein by reference. This application is also related to U.S. patent application Ser. No. 12/833,759, filed Jul. 9, 2010, and entitled System and Method for Providing Interactive Services Using a Mobile Device.

BACKGROUND OF THE INVENTION

Mobile multimedia devices are currently constrained to either one-way operation, or two-way interactivity, for example on an integrated mobile telephone device. The former devices do not have interactivity, and the latter are closely tied to a mobile telephone service provider. In one embodiment, the current invention enables a mobile multimedia device to use one or more wireless services for interactivity.

SUMMARY OF THE INVENTION

In a first aspect, a method of providing interactive services to a mobile device, comprising: transmitting programming on-air to a mobile device by a first facility in communication with a service provider; and receiving by a second facility comprising a wireless access point in communication with the service provider first information based on the programming from the mobile device is provided.

In a second aspect, a system for providing interactive services to a mobile device, comprising: means for transmitting programming on-air to a mobile device by a first facility in communication with a service provider; and means for receiving by a second facility comprising a wireless access point in communication with the service provider first information based on the programming from the mobile device using a first wireless connection is provided.

In a third aspect, a computer software product, comprising coded instructions for executing a computer process in a digital processor, which computer process manages providing interactive services to a mobile device, the computer process comprising: managing transmitting programming on-air to a mobile device by a first facility in communication with a service provider; and managing receiving by a second facility comprising a wireless access point in communication with the service provider information based on the programming from the mobile device is provided.

In a fourth aspect, a method of providing interactive services to a mobile device, comprising: receiving programming over-the-air by a mobile device from a first facility in communication with a service provider; and transmitting by the mobile device to a second facility comprising a wireless access point in communication with the service provider first information based on the programming is provided.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
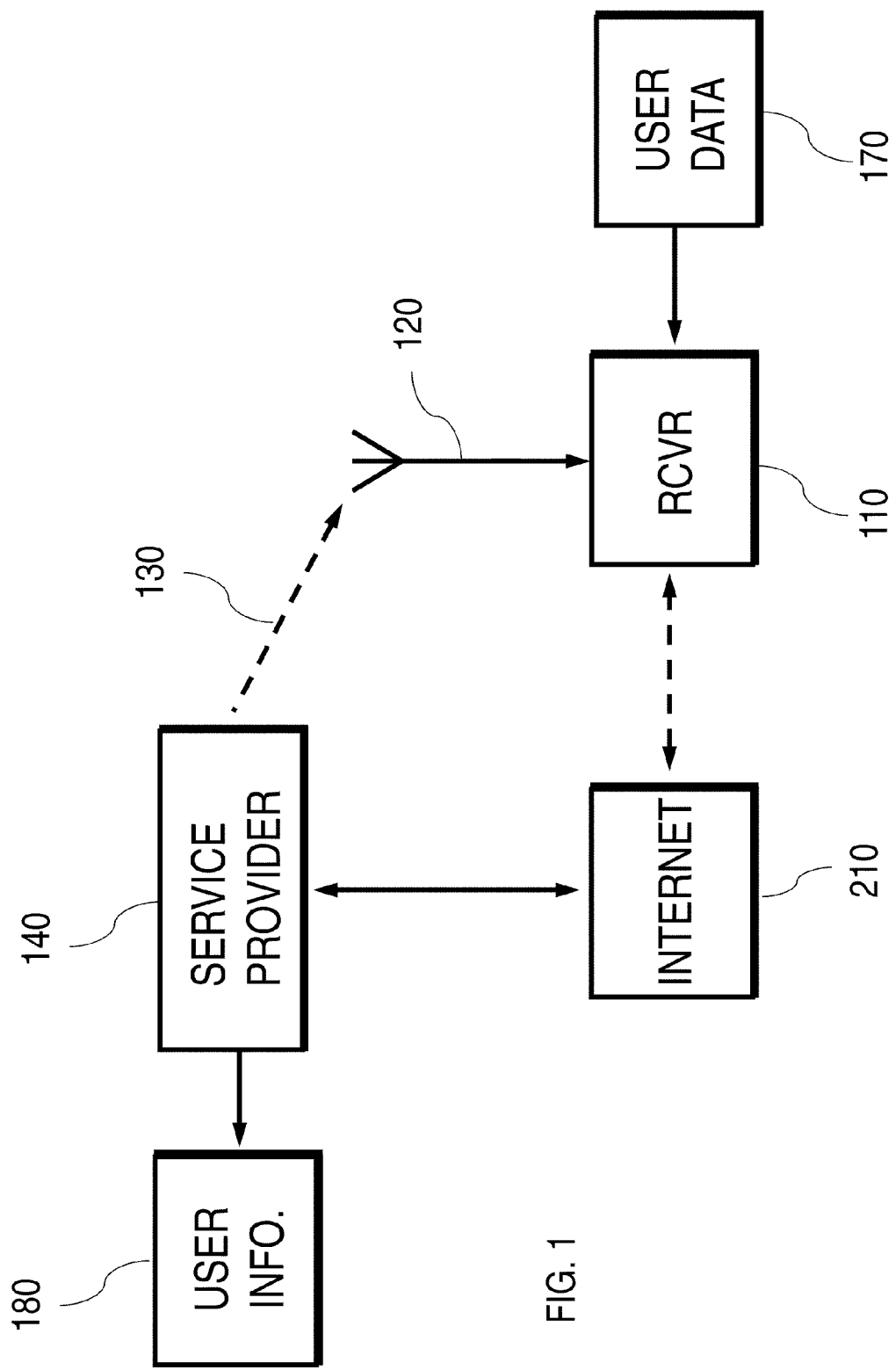
FIG. 1 shows a basic block diagram of one overall embodiment.

Certain terminology is used herein for convenience only and is not to be taken as a limitation on the embodiments of the present invention. In the drawings, the same reference letters are employed for designating the same elements throughout the several figures.

One high level functional embodiment of the basic building blocks and information flows of the invention is illustrated in FIG. 1. The embodiment of FIG. 1 may utilize, but is not limited to utilizing, the following technologies: digital video mobile transmission and reception, Internet data communications, short-distance wireless data communication and IEEE 802.11 (also known as WiFi) wireless communication.

Digital mobile video transmission may include over-the-air transmission according to any of a variety of standardized transmission protocols, such as ATSC, ATSC Mobile, DVB-T, DVB-H, ISDB-T, 1-Seg, DMB-T, and MBMS, among others, as well as proprietary services such as Sirius satellite video, MediaFlo, "wireless cable" and the like. In general any transmission system capable of supporting over-the-air real time transmission of multimedia information may be used.

Internet data communications may include connections to the Internet provided by any number of access technologies such as digital cable, Digital Subscriber Line (DSL), WiFi, WiMax and the like, whether provided by private Internet Service Providers (ISPs) or public entities such as municipal WiFi networks. In general any transmission system capable of supporting transmission of digital information to and from the Internet at a sufficiently high rate may be used.

Short-distance wireless data communication may include protocols such as IEEE 802.x, Zigbee, Ultra-wideband (UWB), and Bluetooth. Short-distance wireless data communication may also include optical methods such as an Infrared communications link. In general any transmission system capable of supporting short-range wireless transmission of information at a sufficiently high rate may be used.

Bluetooth is a well known standard for short-range digital communications that includes variants capable of supporting real-time transmission of audio-visual information.

Referring again to FIG. 1, A user-operated receiver (110) provides entertainment, such as audio-visual programming and the like, to a user. The user-operated receiver uses an antenna (120) to receive programs by means of an over-the-air transmission (130) that is sent by a service provider (140). The service provider (140) may include an over-the-air transmission facility. Alternatively, the service provider (140) may communicate with a separate over-the-air transmission facility, as described in more detail below. This over-the-air transmission is inherently uni-directional, so, interactive return information in the form of user data (170) may be provided to the service provider as user information (180) by means of, in some embodiments, an Internet connection (210).

Interactive return information may include, for example, time-sensitive information such as responses to polls and/or games presented to a viewer using a display associated with receiver (110), as well as less time sensitive information such as requests for further information about a product and/or user demographic information. In general interactive return information may include any information supplied by the user as user data (170).

Figure 2:
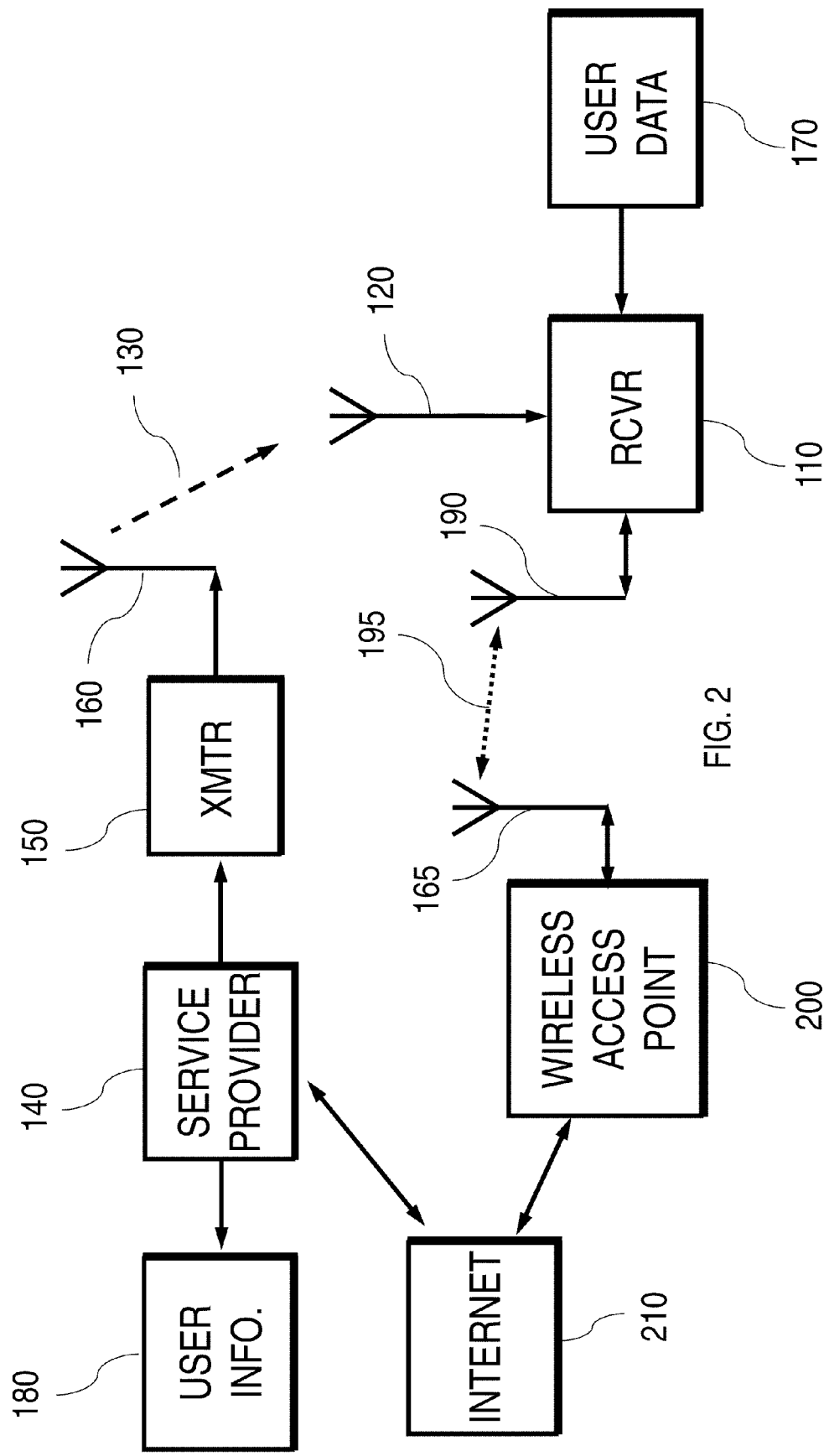
FIG. 2 shows a user-operated receiver in communication with a user-maintained wireless access point to relay user data to a service provider.

Referring now to FIG. 2, in some embodiments, the user-operated receiver (110) communicates with a user-maintained wireless access point (200) to relay user data to the service provider by means of a short-range antenna (190) and wireless connection (195). This data is then relayed to the service provider by means of the Internet connection (210). In a likewise fashion, the service provider may send data directly to the user-operated receiver (110) by means of the Internet and wireless access point (200), which wireless access point may, in some embodiments, be maintained by the user. The service provider (140) may use a transmitter (150) and antenna (160) to implement the over-the-air transmission (130). The transmission facility comprising the transmitter (150) and antenna (160) may or may not be maintained by the service provider.

In some embodiments, user-operated receiver (110) may use a bi-directional short-range wireless connection (195) to communicate with wireless access point (200) by means of a short-range antenna (190). In some embodiments, bi-directional connection (190) may comprise two uni-directional connections, e.g., one connection from receiver (110) to wireless access point (200) and one connection from wireless access point (200) to receiver (110).

In some embodiments, the user data (170) includes a history of the user's audio-visual program viewing, and other user preferences. The user data (170) may then be relayed to the service provider by means of a short range wireless connection (195), for example, an IEEE 802.11 connection, and the Internet connection (210), for example, an Internet connection provided by the user's Internet Service Provider (ISP). The complete return data path communication may be automated, so that no direct user input is required.

In some embodiments, the service provider may send data to the user-operated receiver (110) over Internet connection (210) and short-range wireless connection (195). This data may include applications that may execute on the user-operated receiver, including user-interface applications and the like.

In some embodiments, as illustrated by the preceding examples, Internet connection (210) and short-range wireless connection (195) need not be bi-directional, For example if there is no requirement to transmit data from the service provider to the receiver (110), then short-range wireless connection (195) may be uni-directional from receiver (110) to wireless access point (200) and Internet connection (210) may be uni-directional from wireless access point (200) to service provider (140). Likewise at any given instant, and even for extended periods of time, in some embodiments there may be no need to transmit any user data (170), and in such embodiments Internet connection (210) need only be uni-directional from service provider (140) to wireless access point (200), and short-range wireless connection (195) need only be uni-directional from wireless access point (200) to receiver (110) the vast majority of the time. However, it should be noted that in most embodiments there may be at least some brief bi-directional communications over short-range wireless connection (195) and/or Internet connection (210) to set up and possibly secure wireless connection (195) for subsequent data communications, which data communications may be uni-directional as described above. Protocols for setting up and, if necessary, securing short range wireless connections such as wireless connection (195) are well known in the art. For example most lap top computers comprising IEEE 802.11/WiFi capability also comprise software that can set up and secure connections to wireless access points. Such connections may be set up automatically, e.g., in the case of access points that have been used before, or semi-automatically, e.g., in cases where the computer has detected a previously-unused access point. The invention is agnostic as to the details of connection (195) set up insofar as the set up may comprise automatic, semi-automatic, or manual (e.g., requiring some level of user intervention) steps.

Figure 3:
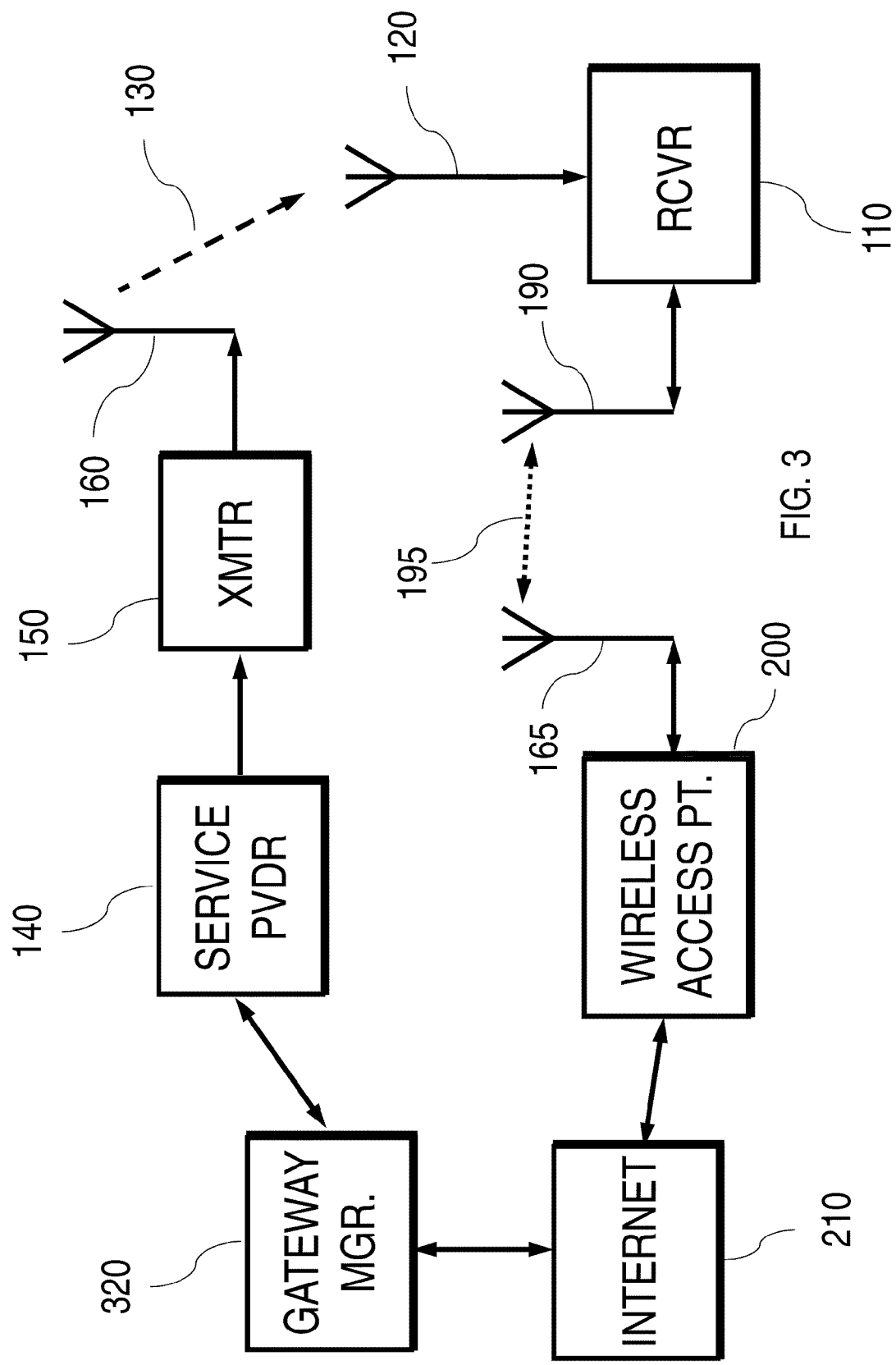
FIG. 3 shows a basic block diagram of one overall embodiment comprising a gateway manager.

Referring now to FIG. 3, in some embodiments, a gateway manager (320) may interface with service provider (140) and, via Internet connection (210), a wireless transmission/reception facility comprising a wireless access point (200), which uses an antenna (165) to receive and/or transmit information by means of wireless connection (195). For example, in some embodiments wireless access point (200) may be considered to comprise part of a distributed transmission/reception facility of an Internet Service Provider (ISP). In general wireless access point (200) may comprise part of any transmission/reception facility capable of communicating with mobile device (110) at a data rate sufficient to support wireless connection (195) without loss of data. For example in some embodiments mobile device (110) may comprise an audio/visual (A/V) receiver comprising an IEEE 802.11 wireless interface, and wireless access point (200) may support IEEE 802.11 communications with the mobile device (110).

Figure 4:
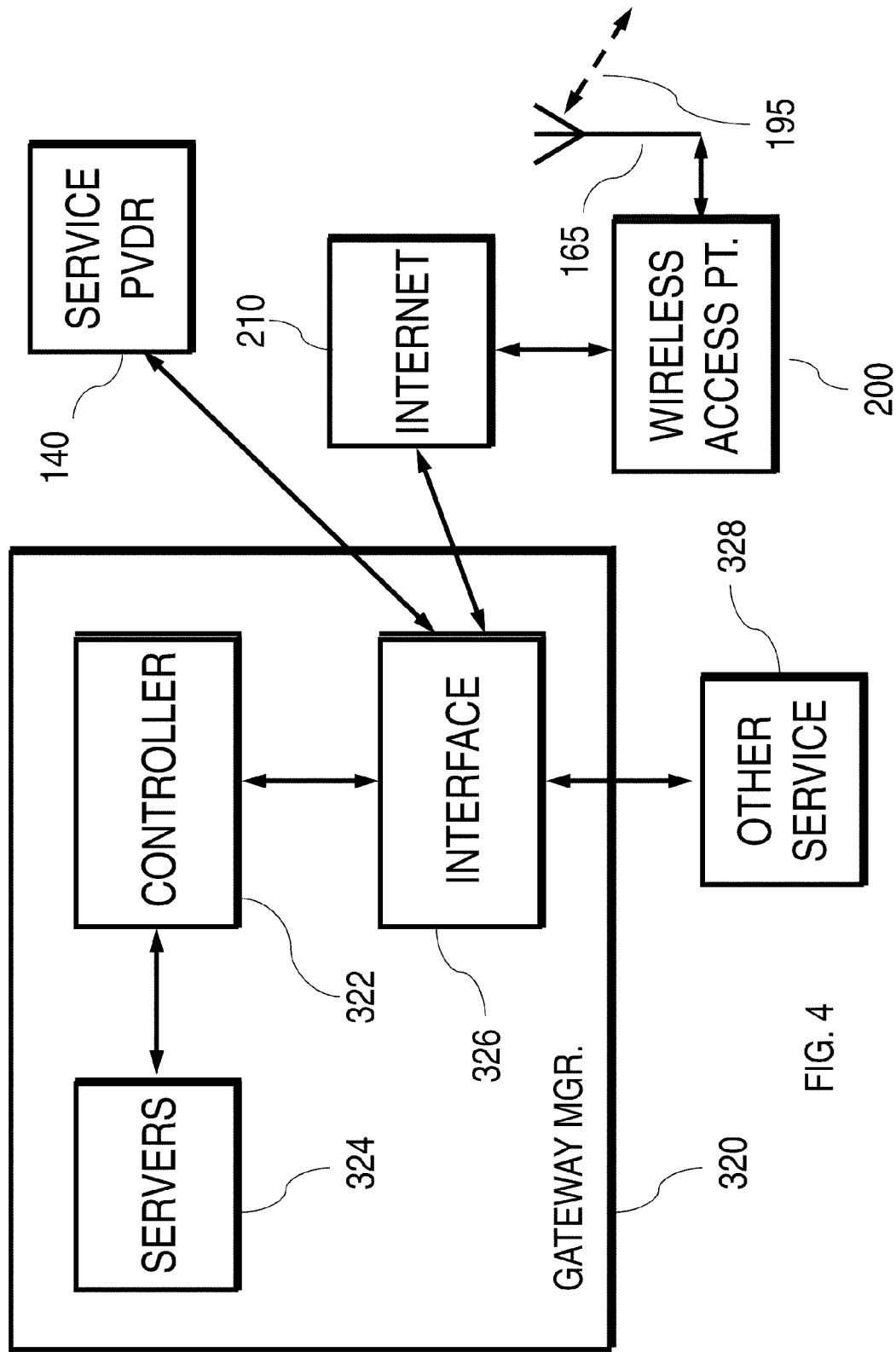
FIG. 4 shows a functional diagram of one embodiment of a gateway manager.

Referring now to FIG. 4, in some embodiments, gateway manager (320) may comprise one or more servers for storing, as examples, application programs and/or audio-visual programming to be relayed by wireless access point (200) to receiver (110), and/or user data relayed by wireless access point (200) from receiver (110) to service provider (140). Controller (322) may manage the operations of servers (324) and interface (326). Interface (326) may provide data routing and/or protocol conversion functions to allow data to be exchanged among service provider (140), servers (324) and the Internet. Interface (326) may also comprise interfaces to one or more other content/service providers (328) besides service provider (140).

Figure 5:
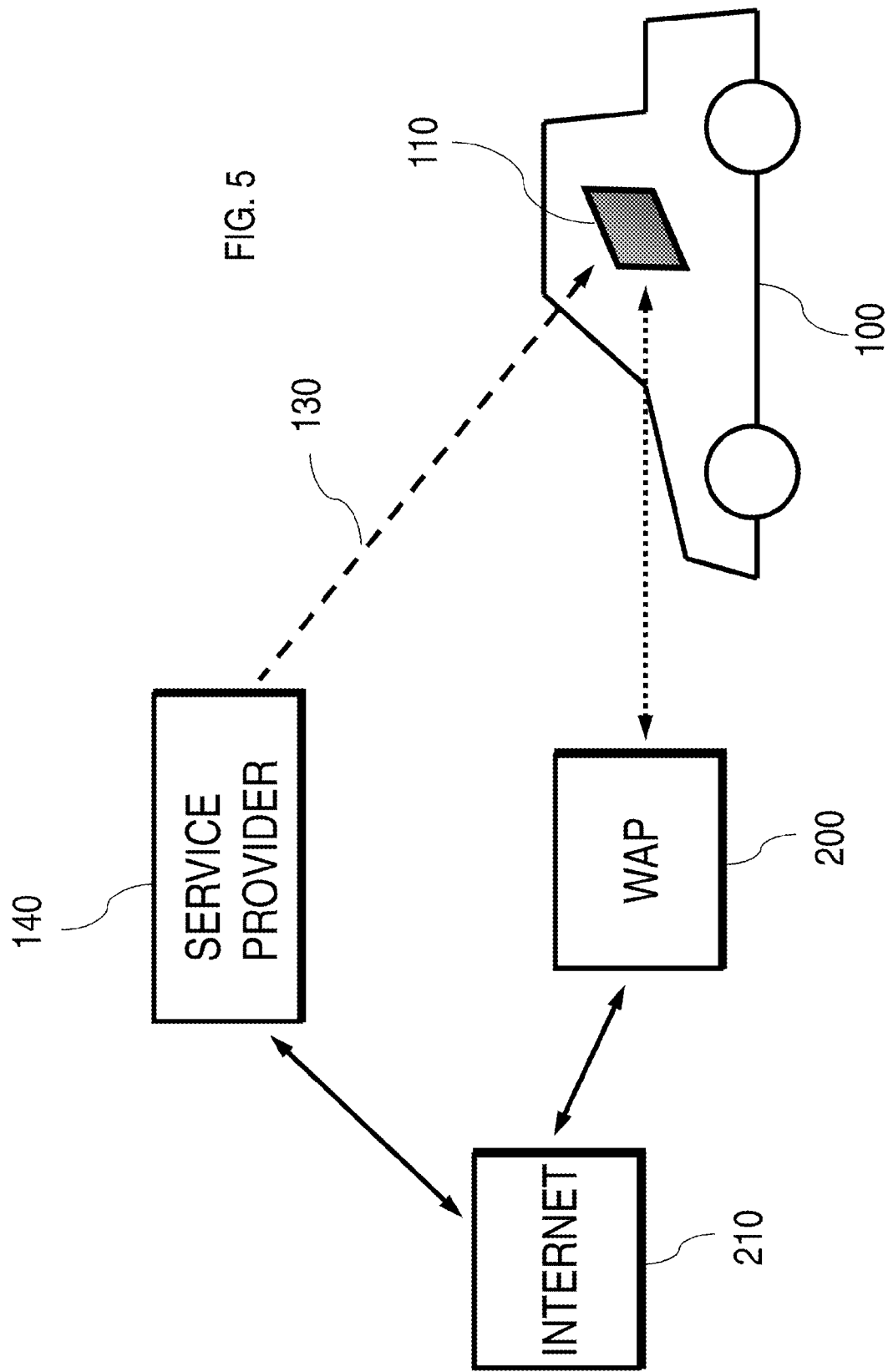
FIG. 5 shows a user-operated receiver in residence in a user-maintained motor vehicle.

In some embodiments, as shown in FIG. 5, the user-operated receiver resides in a user-maintained motor vehicle (100), which may be regularly in close proximity to wireless access point (200) (also called "WAP"). The ongoing return of the user-maintained motor vehicle (100) to the close proximity of wireless access point (200) allows the user-operated receiver to intercommunicate on an ongoing basis with the service provider by means of Internet connection (210).

Figure 6:
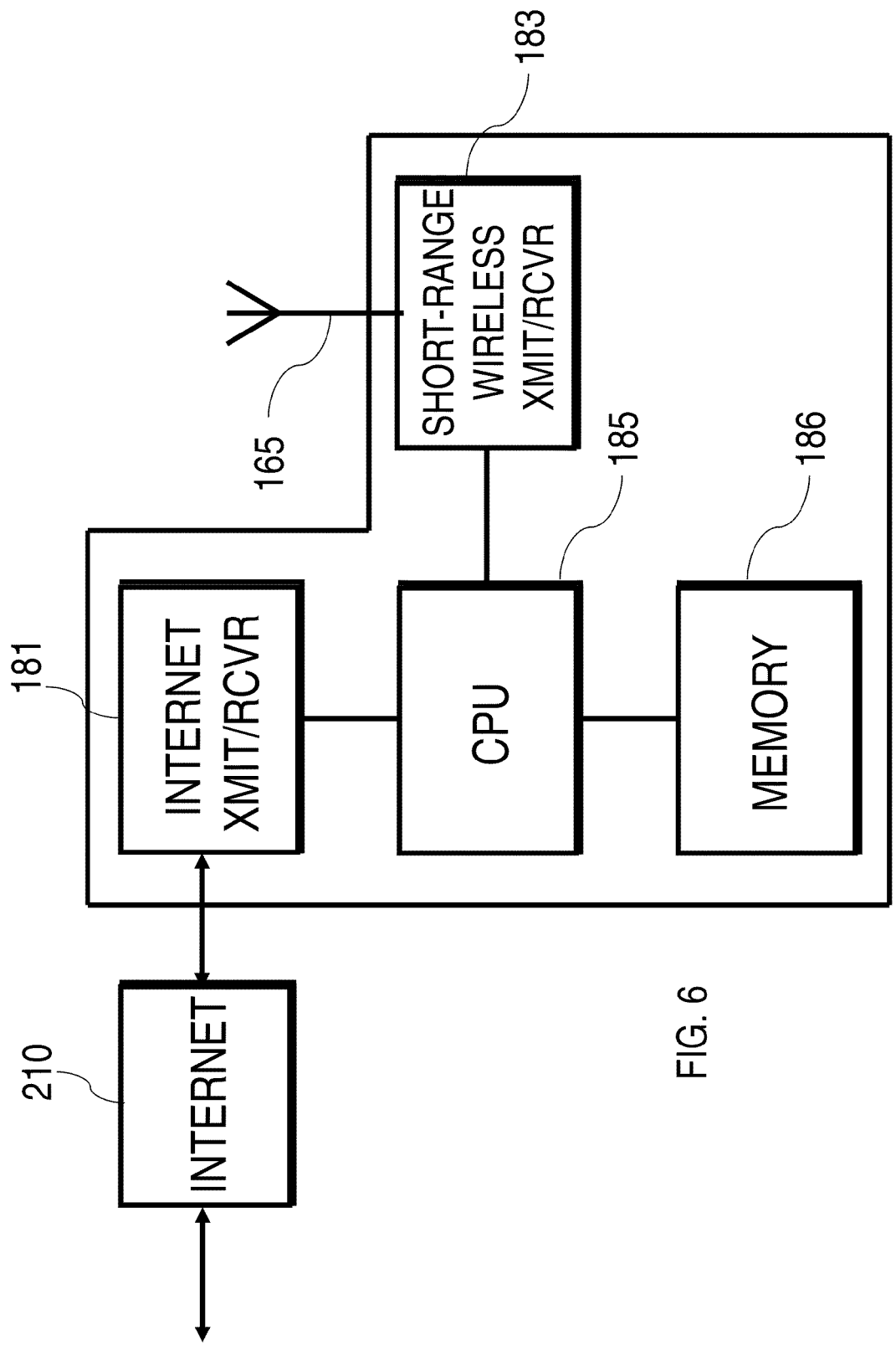
FIG. 6 shows one embodiment of a wireless access point.

Referring now to FIG. 6, in some embodiments wireless access point (200) may comprise an Internet interface (181) that may communicate with service provider (140), as described above with reference to the preceding figures, using Internet connection (210). Wireless access point (200) may also comprise a short-range wireless transmitter/receiver (183) that may communicate with receiver (110), as described above with reference to FIG. 2, FIG. 3 and FIG. 5. Short-range wireless transmitter/receiver (183) may, for example, comprise an IEEE 802.11 transmitter and/or IEEE802.11 receiver and/or a Bluetooth transmitter and/or Bluetooth receiver. Wireless access point (200) may further comprise memory (186), which memory may further comprise solid-state memory and/or hard disk memory suitable for storing application programs and data. For example memory (186) may comprise a hard drive suitable for storing large amounts of audio/visual programming. Software and/or firmware executed by CPU (185) may manage the various functions (181), (183), (186), as well other functions (for example, a maintenance interface) that may comprise wireless access point (200).

Figure 7:
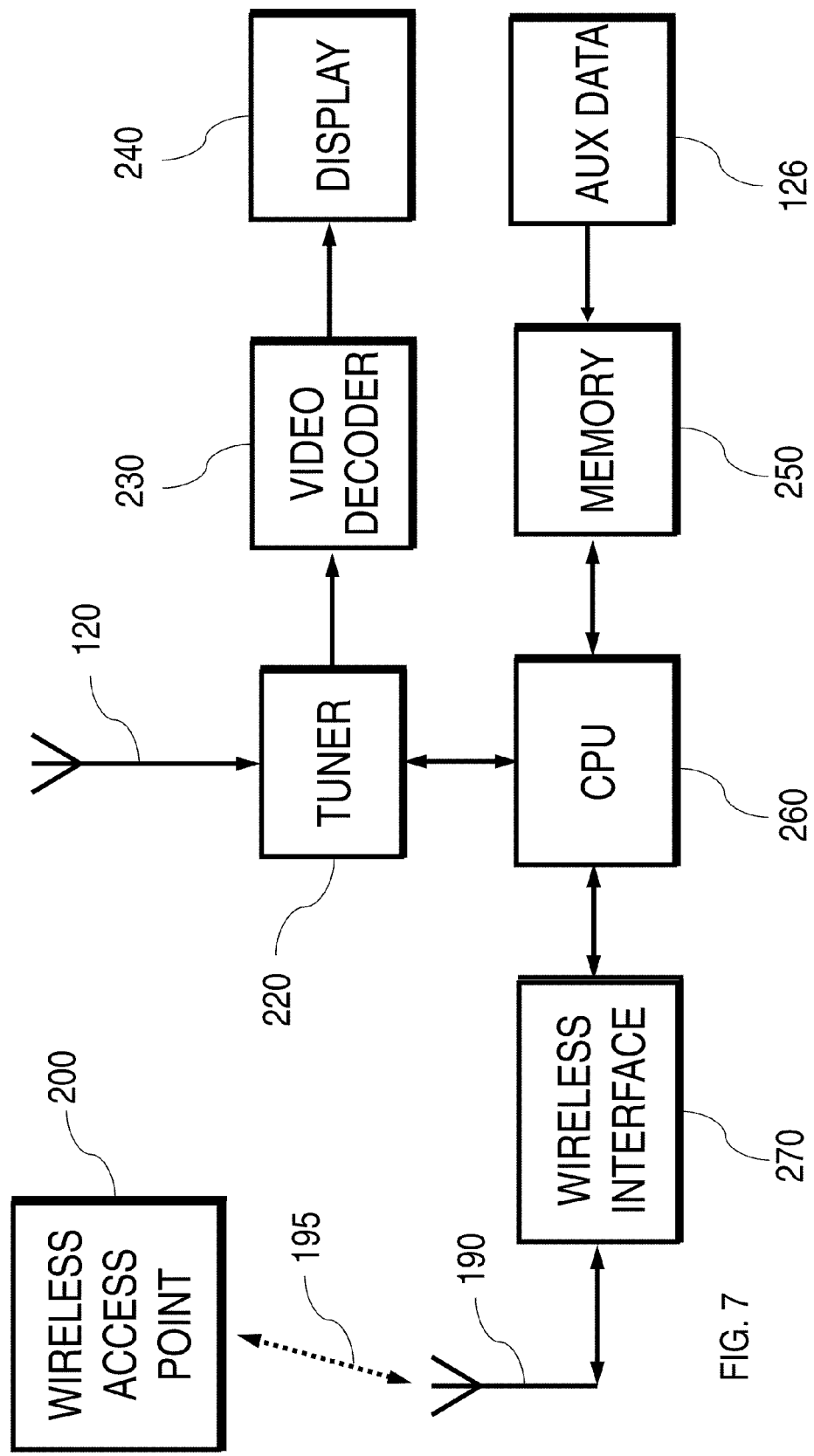
FIG. 7 shows one embodiment of a user-operated multimedia receiver.

The user-operated receiver may typically contain a tuner (220), as shown in FIG. 7, with which to select over-the-air broadcasts, and a video decoder (230) and video display (240) with which to reproduce audio-visual programming. The user-operated receiver may maintain information in a non-volatile memory (250). This information may include a combination of user-supplied input and broadcaster-supplied data and other applications that may execute within the user-operated receiver. User supplied input may be input using, for example a keyboard, touch-sensitive screen, or voice input device (not shown in FIG. 5) associated with receiver (110) and managed by CPU (240). CPU (240) may process user supplied input before storing it in memory (250). For example, CPU (240) may run speech-recognition software to convert digitized speech from a voice input device representing a user program selection to a digital data representation of the program selection before storing the digital data representation in a database of program selections stored in memory (250). The information about program selections may be used, in some embodiments, to provide personalized functionality to the user-operated receiver. CPU (260) may handle the data transactions, and send and receive data to and from the wireless access point by means of a wireless interface (270) and short-range antenna (190). In some embodiments, the wireless interface may use one of the standard IEEE-802.11 wireless local area network (WLAN) communication protocols.

Figure 8:
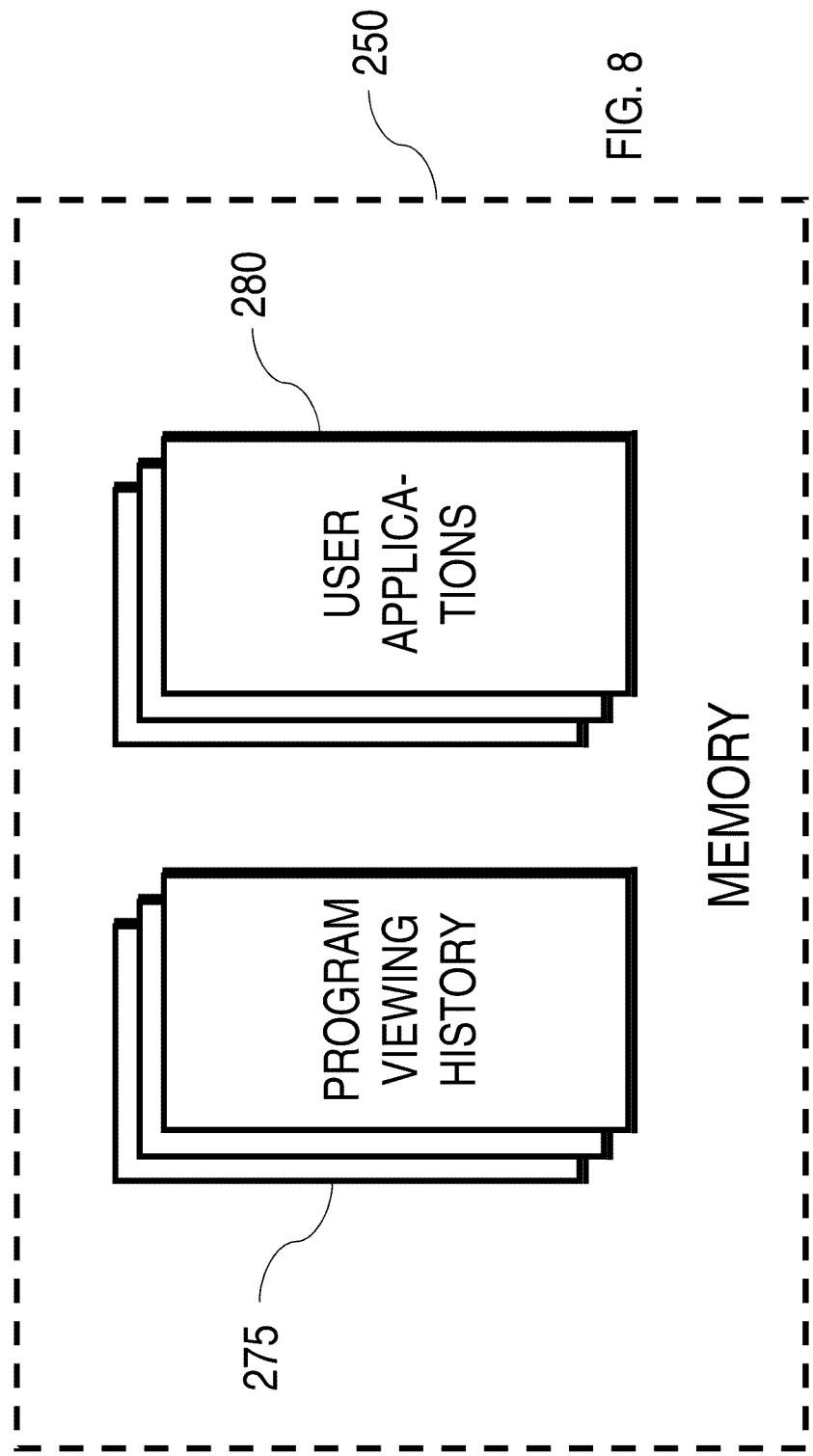
FIG. 8 shows an embodiment of non-volatile memory for storing application programs and/or the program viewing history of one or more users.
Figure 9:
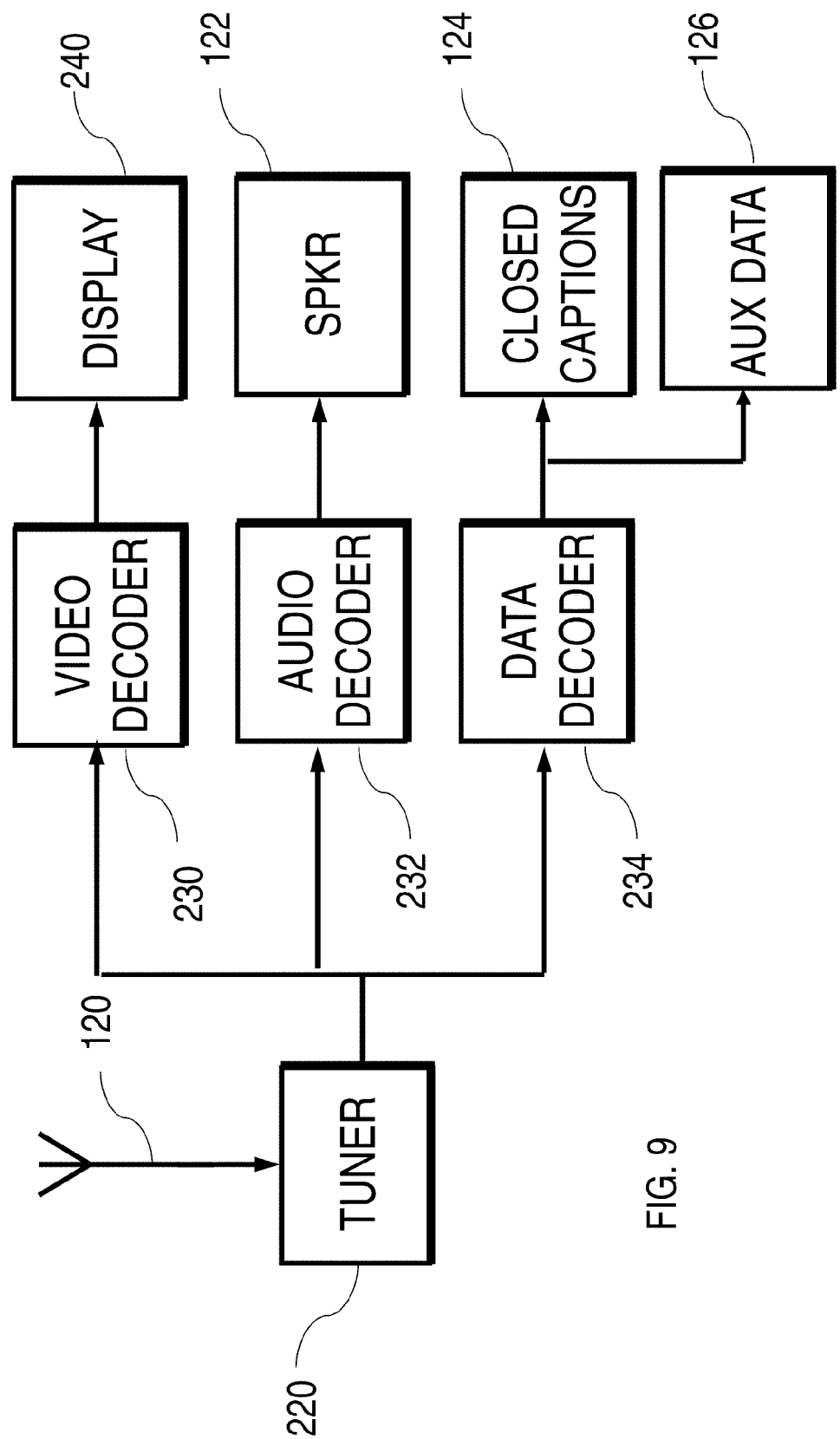
FIG. 9 shows a partial embodiment of a user-operated multimedia receiver.

The user-operated receiver (110) non-volatile memory may contain various types of user specific information, as shown in FIG. 8, such as a history of the user's program viewing (275), as well as multiple user applications (280). User applications (280) may be pre-stored in receiver (110) at the factory where receiver (110) is manufactured. User applications may also be downloaded and stored into memory (250) using the wireless interface (270), as shown in FIG. 7, and/or, as shown in FIG. 9, as auxiliary data (126) output by a data decoder (234), that decodes data received using tuner (220). For example, the signal received by tuner (220) may comprise an MPEG transport stream containing not only audio-visual data, but also data representing user application programs. The output of tuner (220) may be demultiplexed into video data, audio data, and auxiliary data. Demultiplexed video data may be decoded by video decoder (230) and sent to display (240) Audio data may be decoded by audio decoder (232) and sent to speaker (122) or headphones. Auxiliary data (126), which may in some embodiments comprise application programs, may be sent to memory (250), as shown in FIG. 7, for storage as applications data (280). Demultiplexed auxiliary data may be stored directly into memory (250) by a Direct Memory Access (DMA) controller function (not shown in FIG. 7), the design of which is well known to those of normal skill in the digital design arts. Alternatively, auxiliary data may be sent to CPU (260) and CPU (260) may then store the auxiliary data in memory (250).

Figure 10:
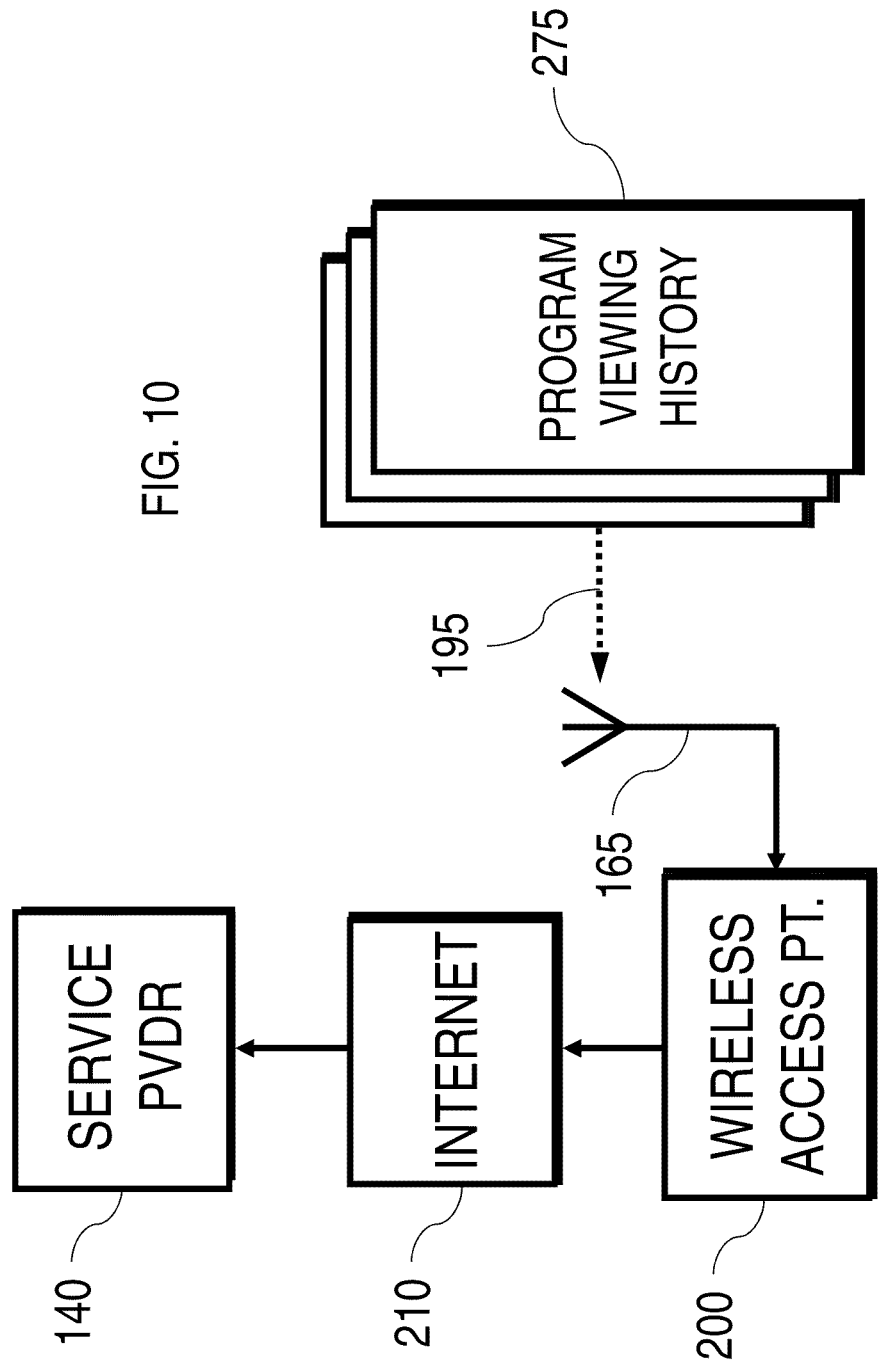
FIG. 10 shows an embodiment of transmitting program viewing history to a service provider using a wireless access point as a relay.

Program viewing history (275) may be sent to the service provider, as shown in FIG. 10, for example, so that the service provider can aggregate statistical information on program viewing behavior of multiple users. For example a representation of the program viewing history (275) may be retrieved from memory (250) by CPU (260) and sent to service provider (140) using wireless interface (270). Program viewing information may be gathered automatically, or upon explicit request.

Program viewing history (275) may be explicitly sent to service provider (150) following a request from service provider (140) relayed to receiver (110) by wireless access point (200). Upon receiving the request, CPU (260) may then retrieve the program viewing history (275) data from memory (250) and send it to service provider (140) using wireless interface (270).

For example, program viewing information may be automatically (without explicit request from service provider (140) or user intervention) sent to service provider (140) during or after each program is viewed at receiver (110), if short range wireless connection (195) is available, in which case program viewing history (275) may be stored only briefly, or not at all, in memory (250), or alternatively, after some number of programs are viewed, according to the availability of short range wireless connection (195).

Referring again to FIG. 8, the user applications (280) may be specific to each user-operated receiver (110), or of a common type that can be used by a multitude of different user-operated receivers. One example of such a user application (280) is a user-interface application that provides a method to present data to the user and to provide user input to the user-operated receiver (110).

The program viewing history (275) and the user applications (280) may also modify the manner in which the user-operated receiver functions. One such method of functional modification is to download new operating system software, software components, APIs, etc. to the user-operated receiver.

Personalized functionality may be provided to receiver (110), for example, by downloading new applications (280) into memory (250) based upon the pre-download set of applications (280) and the program viewing history (275). For example the program viewing history (275) may indicate that the user may benefit from an update to an existing user interface application (280), which update includes better support for interactive features of programs previously viewed, and a download request may be queued to acquire the update from service provider (140) via wireless access point (200) according to the availability of wireless connection (195) and Internet connection (210).

Figure 11:
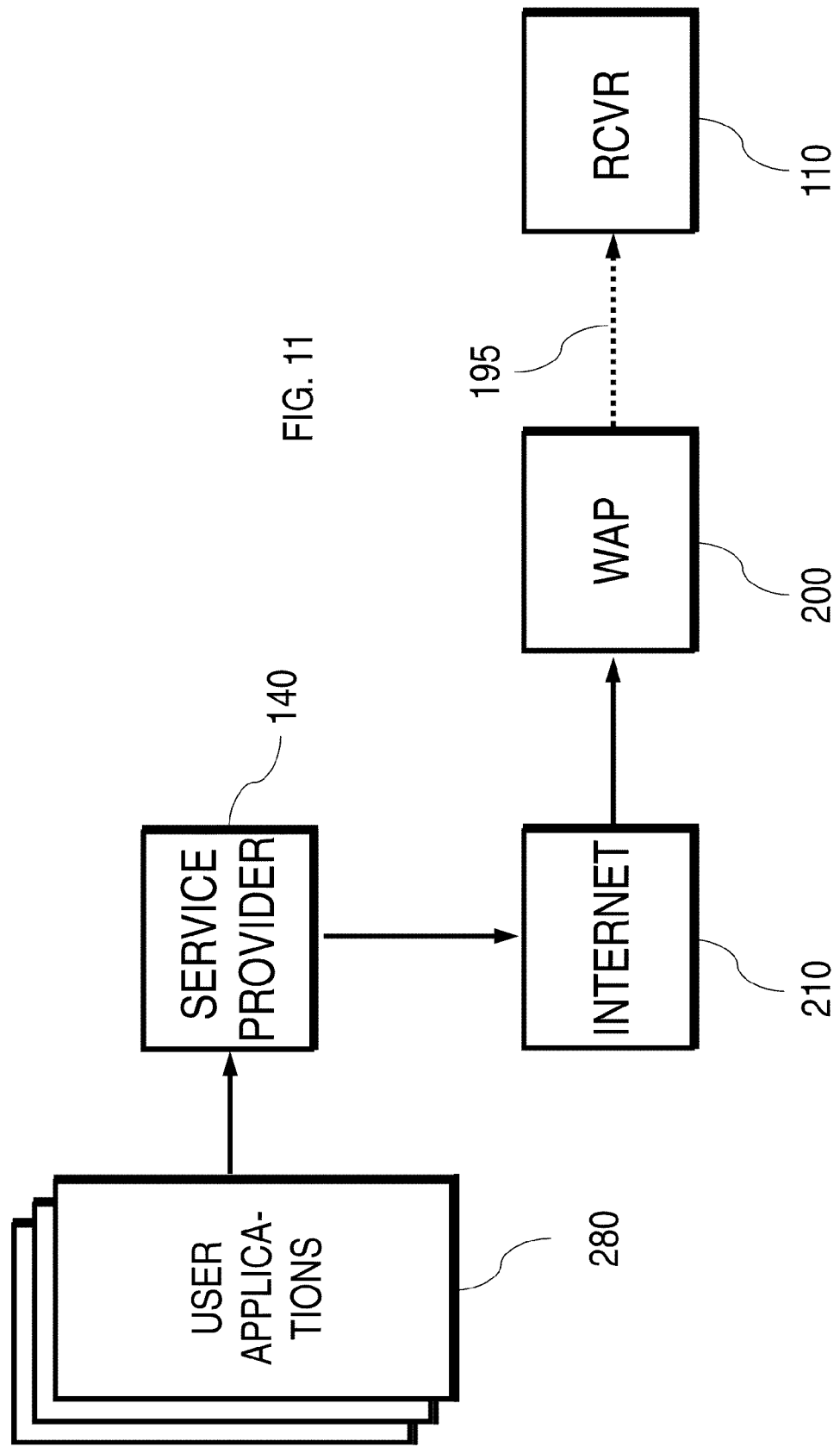
FIG. 11 shows user applications being sent by a service provider to a user operated receiver by means of an Internet connection and a wireless access point.

Referring now to FIG. 11, user applications (280) can be sent by the service provider to the user operated receiver (110) by means of the Internet connection (210) and the wireless access point (200). Alternatively or alternately, the user applications (280) can be sent by the service provider to the user operated receiver (110) by other means, such as by over-the-air transmission (130).

Figure 12:
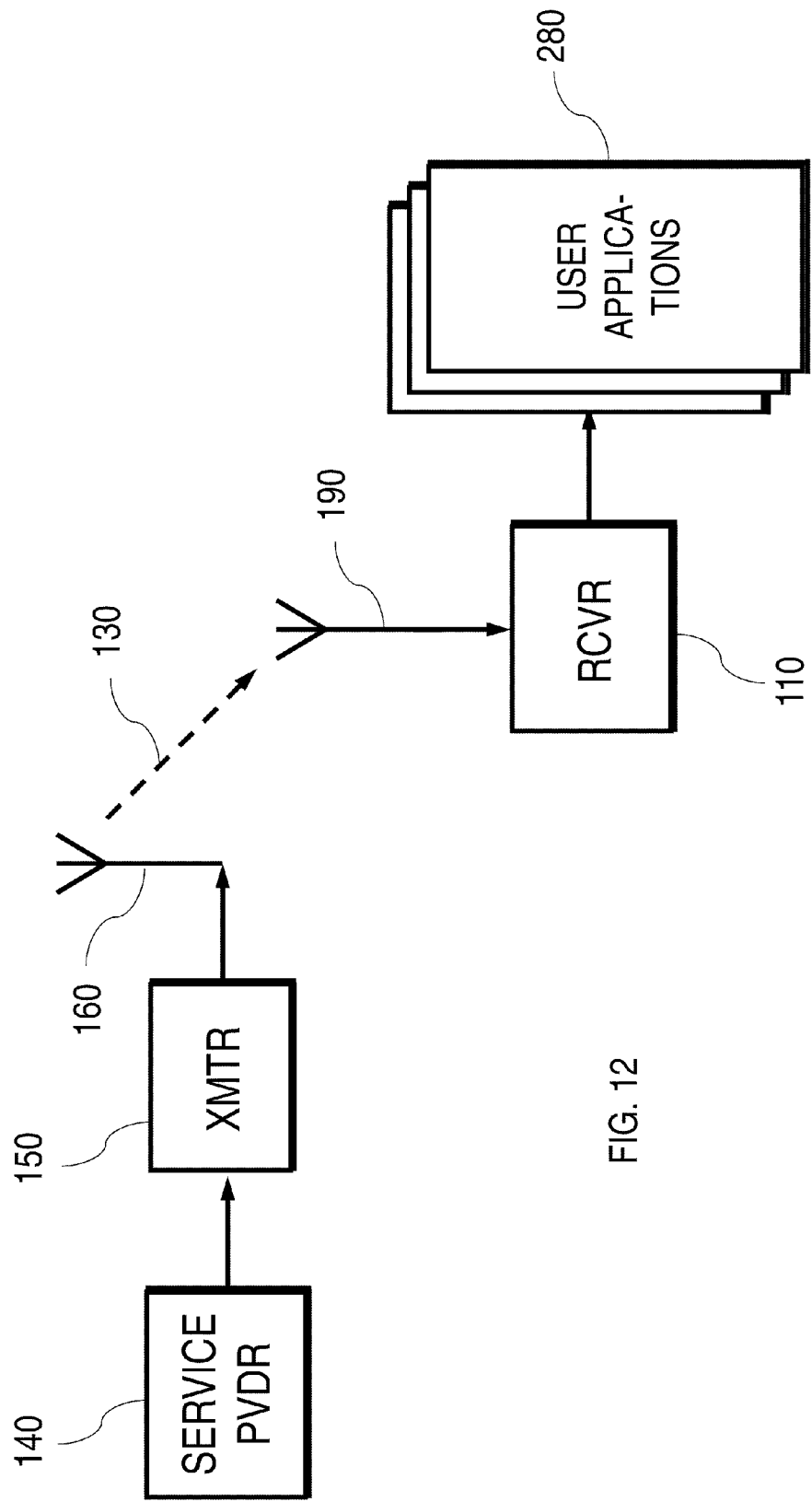
FIG. 12 shows an embodiment of transmitting an application program from a service provider to a user-operated multimedia receiver using an off-air broadcast network.

The user applications (280) may be sent to the user-operated receiver by means of the wireless network, using wireless connection (195) and Internet connection (210) as shown in FIG. 11, or alternatively, using over the over-the-air transmission (130), as shown in FIG. 12. A combination of the two download mechanisms is also possible. For example one or the other of the connections (195) and (130) may be unavailable at any given time, for example due to non-proximity of vehicle (100) to wireless access point (200), in the case of connection (195), and a download partially completed using one of the two connections (195) and (130) may be completed by using the other of the connections (130) and (195). In another example, one of the connections (195) and (130) may carry a higher monetary charge to the user's account for downloading, and the service provider may choose the lower cost connection to minimize the charge to the user at any given time. Many wireless devices (180), for example car navigation systems, include means for determining their geographic location, such as GPS devices. Means of determining locations of wireless transmitters based on comparing signal strengths of wireless transmitter signals received at multiple reception sites, such as a number of proximate wireless access points (200), are also well known. The service provider may interrogate, for example, the receiver (110), and/or one or more ISPs that support any number of wireless access points (200) to determine the location of receiver (110) and/or one or more wireless access points (200) proximate to receiver (110). The service provider may then choose to use the lower cost connection of either (195) or (130) for the download, based on, for example, locally applicable charges of the ISPs and broadcast transmitter (150) operator.

Figure 13:
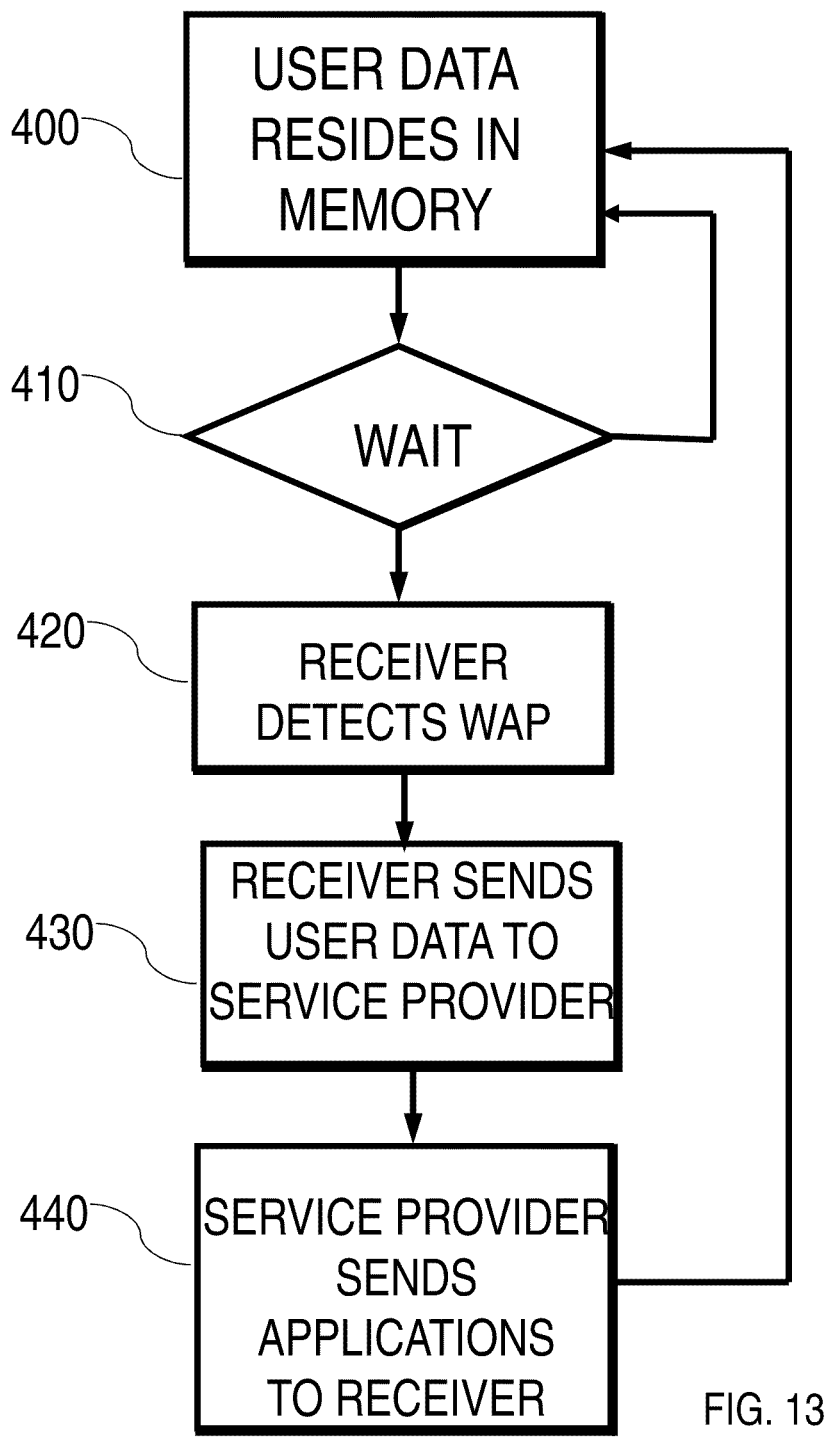
FIG. 13 shows a flow chart of an embodiment of opportunistically sending user data to a service provider and/or receiving applications from a service provider.

The software that supports the functionality of this invention may similarly describe the invention, and some or all of the described features may be realized in software and/or hardware. One such embodiment is shown in FIG. 13. User data is managed in the user-operated receiver (110), and resides (400) in a non-volatile memory e.g., (250). The software program waits (410) until the user-operated receiver (110) detects (420) the close proximity of the user-maintained wireless access point (200). If the user-operated receiver has user data to send, the user-operated receiver may then send (430) the user data to the service provider (140) by means of the user-maintained wireless access point and the Internet connection (210). If the service provider (140) has application or other data to send, the service provider may then take advantage of this connection to send (440) applications to the user-operated receiver (110), which may customize the operation of the particular user-operated receiver. These applications may then reside in the non-volatile memory, and execute as needed. The software program may then wait until the next time that the user-operated receiver (110) detects the close proximity of the user maintained wireless access point (200).

Figure 14:
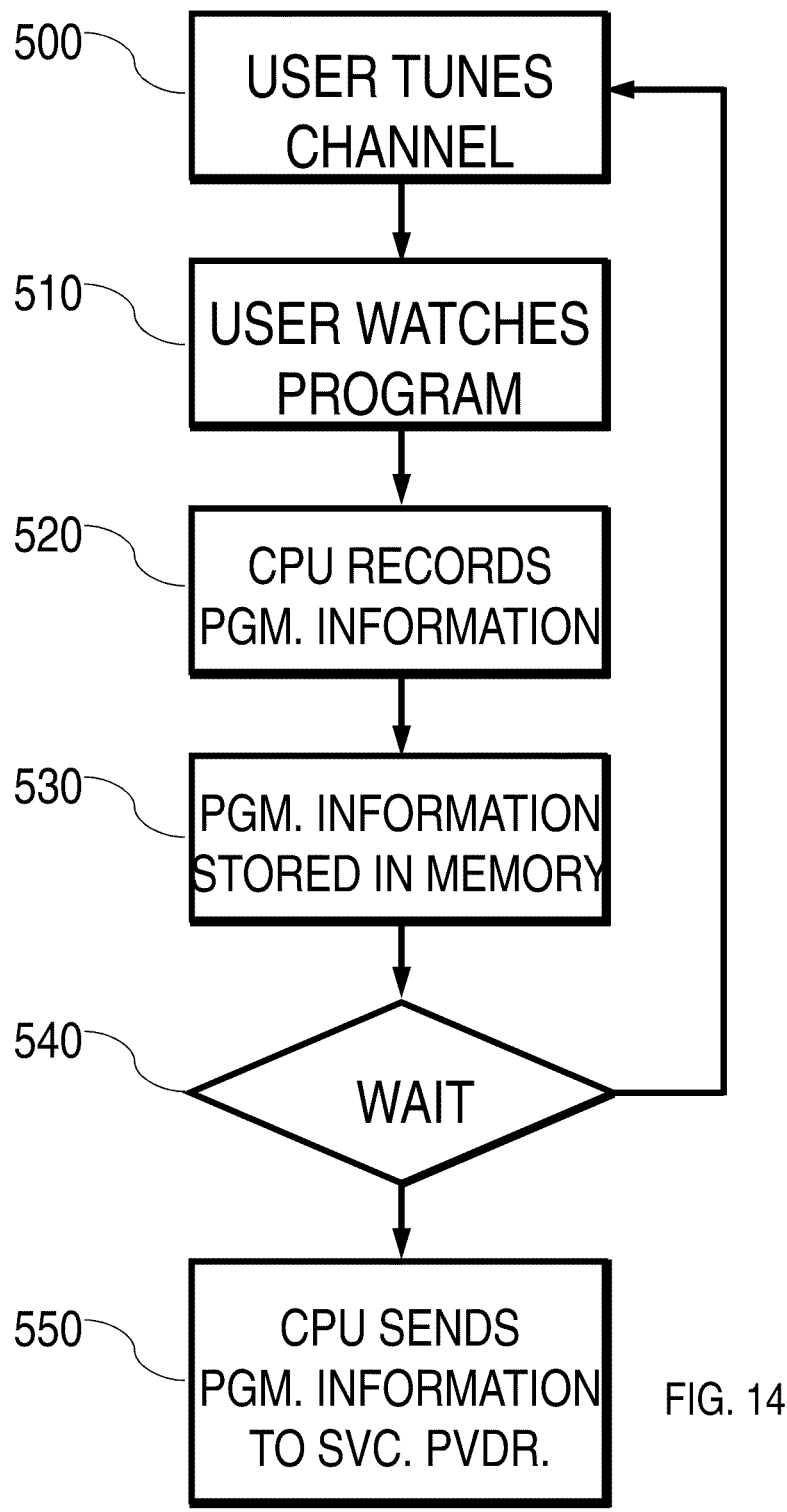
FIG. 14 shows a flow chart of an embodiment of capturing program viewing history and transmitting the viewing history to a service provider.

An embodiment of downloading program viewing information is shown in FIG. 14. The user tunes (500) a channel, for example using tuner (220) to watch (510) a desired program. The CPU (260) records (520) this activity, wherein such data can include the channel identification, program name, time of program consumption, and/or similar information. This data may then be stored (530) in memory (250), for future retrieval. The receiver (110) may then wait (540) and repeat this process for a predetermined length of time. After the predetermined length of time has expired, and the receiver (110) is or becomes proximate to a wireless access point (200), the CPU (260) may send (550) a history of the receiver program information (275) to the service provider (140). The predetermined length of time may be adjusted to provide a compromise between the timely relay of the information and a minimization of wireless connection (195) network access for the return path. Wireless connection (195) access charges may vary according to packet size, geographic location of the receiver (110), and time of day, among other possible factors. For example, CPU 260 may wait (440) until it has accumulated enough program viewing information (275) to populate an integral number of IEEE 802.11 packets before sending (550) the information (275) to the service provider.

VARIATIONS OF THE INVENTION

The connection of the user-operated receiver (110) to the Internet maybe achieved by any other wireless or wired means, including a hard-wired connection.

The user-operated receiver (110) and display unit (240) may also reside permanently in a fixed location, such as the user's residence.

The user applications (280) may be sent ("pushed") by the broadcaster or requested ("pulled") by the receiver.

In an alternative embodiment, also shown in FIG. 5, the user-operated receiver (110) is sporadically in close proximity to a wireless access point (200) that is not maintained by the user. The occasional positioning of the vehicle and user operated receiver (110) to the close proximity of the wireless access point (200) that is not maintained by the user allows the user-operated receiver (110) to intercommunicate on a sporadic basis with the service provider (140) by means of the Internet connection (210).

In another alternative embodiment, also as shown in FIG. 5, the user-operated receiver may regularly be in close proximity to a non-user-maintained wireless access point (200). The ongoing return of the vehicle and user-operated receiver to the close proximity of the wireless access point (200) allows the user-operated receiver (110) to intercommunicate on an ongoing basis with the service provider by means of the Internet connection (210).

Figure 15:
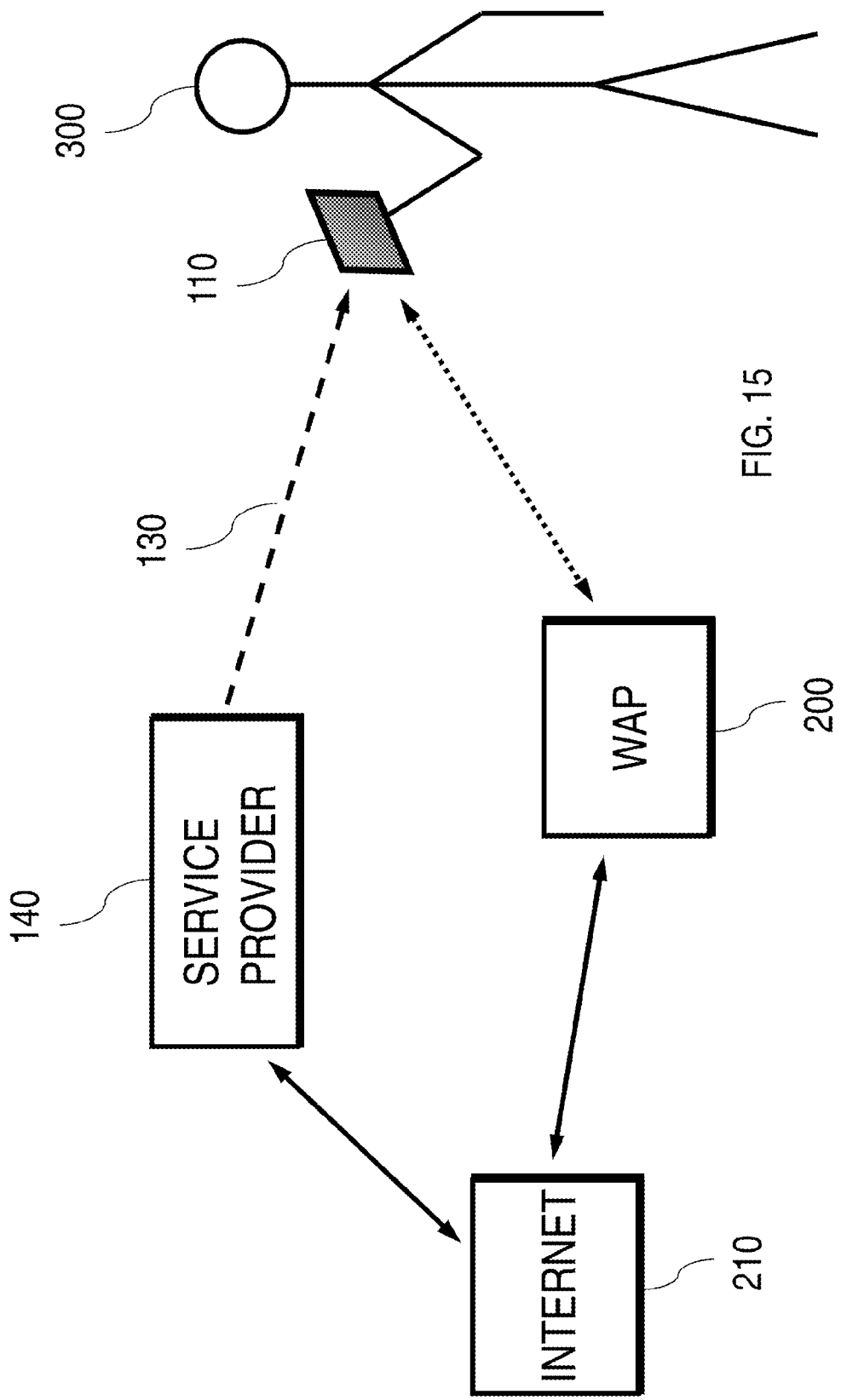
FIG. 15 shows an embodiment wherein a user-operated receiver is carried by a pedestrian user.

In another alternative embodiment, as shown in FIG. 15, the user-operated receiver may be carried by a pedestrian user (300) who is regularly in close proximity to a user maintained or non-user-maintained wireless access point (200). The ongoing return of the user and user-operated receiver to the close proximity of the user-maintained or non-user-maintained wireless access point (200) allows the user-operated receiver (110) to intercommunicate on an ongoing basis with the service provider by means of the Internet connection (210).

In another alternative embodiment, also as shown in FIG. 15, the user-operated receiver (110) is carried by a pedestrian user (300) who is sporadically in close proximity to a wireless access point (200) that is not maintained by the user. The occasional positioning of the user and user operated receiver (110) to the close proximity of the wireless access point (200) that is not maintained by the user allows the user-operated receiver (110) to intercommunicate on a sporadic basis with the service provider (140) by means of the Internet connection (210).

The user-operated receiver (110) including display unit (120) may, in some embodiments, also be described as a mobile TV.

The user-operated receiver (110) including display (240) may alternatively be realized by an appropriately equipped portable computer system, such as a laptop PC equipped with both an over-the-air TV tuner and a short-range wireless connection. The over-the-air tuner and short-range wireless radio may be integrated into the PC, or alternatively maybe provided as plug-in devices. The user-operated receiver and display may be realized by other appropriately equipped portable systems, such as tablet computers, "netbooks," and other hybrid devices of arbitrary size.

The user-operated receiver (110) including display (240) may be realized by a permanently or removably affixed system in an automobile or other vehicle.

The display (240) used to render video images maybe any one of a number of different display types, such as those constructed from alternative materials, bendable screens, and projection devices.

The audio-visual decoder, for example video decoder (230), audio decoder (232), display (240), and speaker (122) may be replaced with other types of processing and user entertainment devices, such as an audio-only decoder and sound reproduction apparatus.

The receiver (110) can process digital data that can also include other services that are supplied to the user, such as closed captions (124).

The wireless access point device (200) used to relay information may conform to, as alternatives to IEEE 802.11, other standards, for example, Bluetooth, IRDA, and the like.

The various antennas described herein, for example (120) and (190), may, in some embodiments be replaced with any of various other radio-frequency (RF) transducers, such as printed-circuit antennas.

Figure 16:
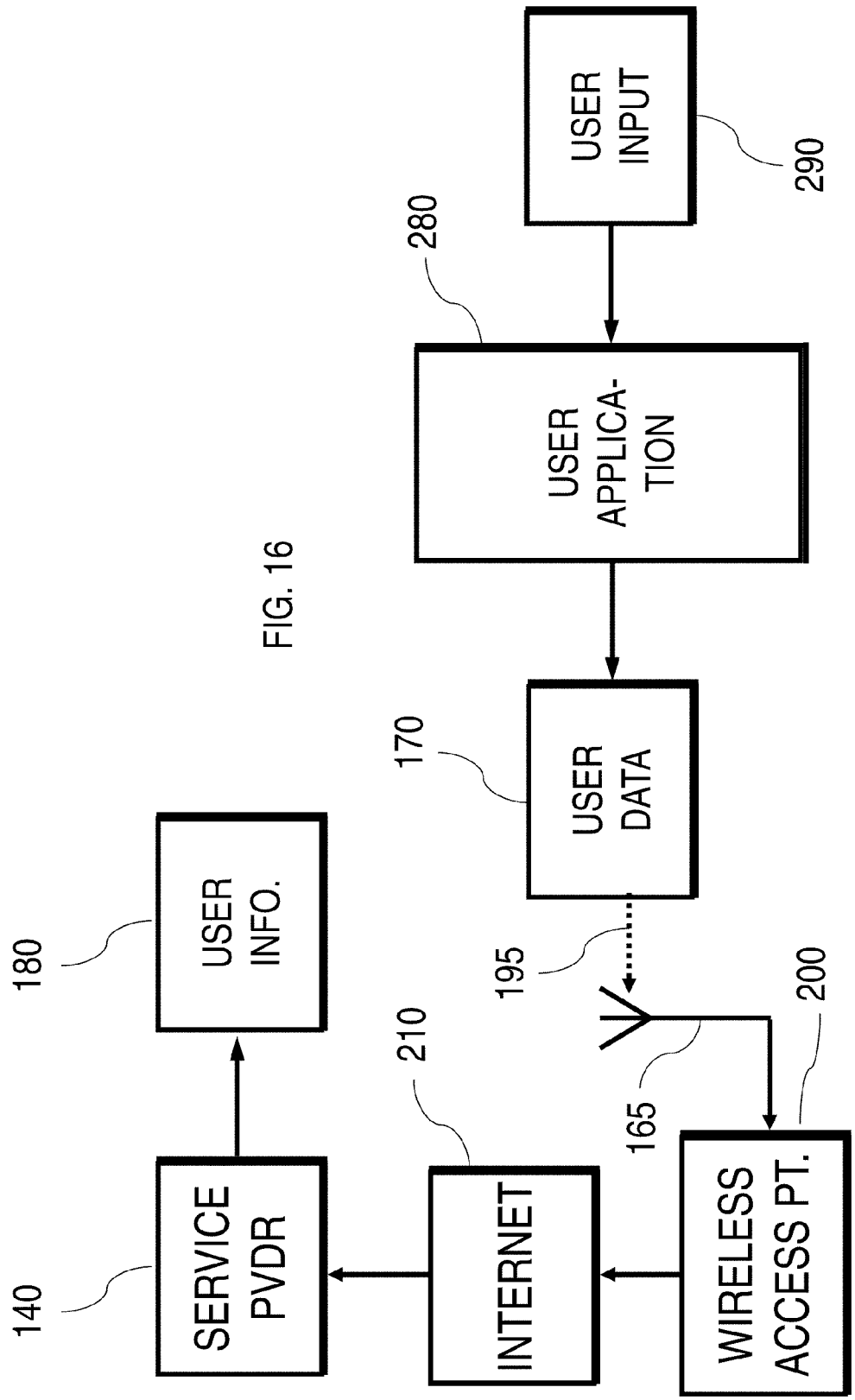
FIG. 16 shows an embodiment of receiving user input by a multimedia receiver and transmitting the user input to a service provider using a wireless access point as a relay.

The user may input data directly into the receiver (290), and that data (170), in turn, can be relayed to the service provider, which can maintain and process the user information (180), as shown in FIG. 16. This data entry can be facilitated by means of an on-screen graphical user interface, using, for example, display (240)

In order to protect the privacy of the users, some or all of the directly-input user data (290) may remain resident in the user-operated receiver (110), according to the user's preferences.

The service provider may comprise multiple entities that are not co-located. For example, the service provider may comprise one or more non-co-located broadcast entities.

The program viewing statistics may be aggregated at receiver (110), wireless access point device (200), or gateway manager (320), to minimize transmission time and/or bandwidth and/or cost. For example, viewing information may be transmitted from receiver (110) to gateway manager (320) after each program is viewed. Processing at gateway manager (320) may reduce the raw viewing information to a smaller amount of information such as statistics only. As a simple example, if a program is viewed more than once, it may not be necessary to transmit all of the information describing the program to the service provider; only the program title and a count of the number of viewings of that program may be transmitted to the service provider.

A program guide may be transmitted from the service provider to gateway manager (320) or wireless access point (200), and the program guide may be accessed by receiver (110) using a simplified user interface. This may minimize storage and/or processing power requirements at receiver (110). For example only a subset of the program guide information may need to be accessed at receiver (110) at any given time.

A program guide transmitted to receiver (110) and/or wireless access point (200) may be based on the location of the receiver or wireless device. Receiver (110) or wireless access point (180) may transmit its location, for example its GPS coordinates, to the service provider, and the service provider may then transmit a program guide appropriate to the location of receiver (110) or wireless access point device (200) to receiver (110) or wireless access point (200). Alternatively, information describing one or more programs currently or recently received by receiver (110) may be transmitted to the service provider and the service provider may then consult a database to determine other programs that may be receivable based on the programs already received. An appropriate program guide containing these potentially-receivable programs may then be transmitted to receiver (110) and/or wireless access point (200) by the service provider.

Wireless access point (200) or gateway manager (320) may run a web browser that may be accessed by a simplified user interface from receiver (110). Interactive video programs may use a web page for interaction, and running the web browser on wireless access point (200) or gateway manager (320) may save processing power at receiver (110).

Receiver (110) or wireless access point (200) may notify the service provider of intermittent loss of reception of a program. The service provider may provide that program to receiver (110), using short range connection (195), during the periods of reception loss. Alternatively, the service provider may provide a summary of the program during periods of reception loss. The summary may comprise video clips and/or audio, and/or text. A delay may be interposed in the video broadcast over connection (130) to accommodate delay in generating the summary.

Wireless access point (200) or gateway manager (320) or service provider (140) may provide an audio-visual programming storage and replay function for receiver (110). Programming data may be transmitted to and received from wireless access point (200) using short range wireless connection (195). For example, wireless access point (200) may include a large hard drive or flash memory to store the programming data. This may save processing power, battery life, storage space and device cost of receiver (110).

The embodiments of the present invention may be implemented with any combination of hardware and software. If implemented as a computer-implemented apparatus, the present invention is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

The invention claimed is:

1. A method of providing interactive services to a mobile device, comprising:
    transmitting programming over-the-air to a mobile device by a first facility in communication with a service provider, wherein the service provider can be notified of intermittent loss of reception of information;
    receiving from the mobile device by a second facility comprising a first wireless access point, wherein the first wireless access point provides audio-visual programming storage and replay function in communication with the service provider, first information comprising location data of the mobile device, wherein the reception of the first information occurs during sporadic intervals when the mobile device is within communication range of the first wireless access point without scheduling the reception through a prior communications session;
    receiving from the mobile device by a third facility comprising a second wireless access point the first information upon notification by the service provider of intermittent loss of reception of information such that partially completed information received through the second facility can be completely received through the third facility; and
    transmitting to the mobile device by the second facility content specific to the mobile device, wherein the content comprises a program guide based on the location of the mobile device and a history of program information delivered to the service provider, wherein the transmission of the content occurs during sporadic transmission intervals when the mobile device is within communication range of the first wireless access point without scheduling the reception through a prior communications session or making the transmission dependent on an explicit request from the mobile device.

2. The method of claim 1, wherein the receiving is responsive to a request transmitted to the mobile device by a facility selected from the group comprising the first facility, the second facility, and the third facility.

3. The method of claim 1, further comprising aggregating programming viewing statistics by a processing node selected from the group comprising the mobile device, the wireless access point, the second facility, a gateway manager and the service provider.

4. The method of claim 1, wherein the first information comprises interactive response information.

5. The method of claim 1, wherein the first information further comprises automatically transmitted program usage information.

6. The method of claim 5, wherein the usage information is generated from information that documents the viewing of the programming.

7. The method of claim 1, wherein the first information is processed by a gateway manager to remove information identifying the user of the mobile device and the processed information is communicated to the service provider.

8. The method of claim 1, further comprising:
    transmitting second information comprising at least one update to user applications of the mobile device by a facility selected from the group comprising the first facility and the second facility, wherein the at least one update is based on pre-update user applications and pre-update usage information of the mobile device.

9. The method of claim 8, further comprising receiving from the mobile device the usage information and information that enumerates the user applications prior to transmitting the update.

10. The method of claim 1, wherein the first information further comprises automatically transmitted viewing preferences of the mobile device user.

11. The method of claim 1, wherein the first information further comprises automatically transmitted device operational preferences of the mobile device user.

12. The method of claim 1, wherein the first information further comprises automatically transmitted demographic information of the mobile device user.

13. The method of claim 1, wherein the first information comprises a direct response from the mobile device to a direct request by the first or second facility.

14. The method of claim 1, wherein the location of said mobile device is determined by a GPS system.

15. A system for providing interactive services to a mobile device, comprising:
    a broadcast transmitter configured for transmitting programming over-the- air to a mobile device by a first facility in communication with a service provider, wherein the service provider can be notified of intermittent loss of reception of information;
    a receiver configured for receiving from the mobile device by a second facility comprising a first wireless access point, wherein the first wireless access point provides audio-visual programming storage and replay function in communication with the service provider, first information comprising location data of the mobile device, wherein the reception of the first information occurs during sporadic intervals when the mobile device is within communication range of the first wireless access point without scheduling the reception through a prior communications session;
    the receiver further configured for receiving from the mobile device by a third facility comprising a second wireless access point the first information upon notification by the service provider of intermittent loss of reception of information such that partially completed information received through the second facility can be completely received through the third facility; and
    the broadcast transmitter further configured for transmitting to the mobile device by the second facility content specific to the mobile device, wherein the content comprises a program guide based on the location of the mobile device and a history of program information delivered to the service provider, wherein the transmission of the content occurs during sporadic transmission intervals when the mobile device is within communication range of the first wireless access point without scheduling the reception through a prior communications session or making the transmission dependent on an explicit request from the mobile device.

16. The system of claim 15, wherein the first information further comprises automatically transmitted information based on the viewing of the programming.

17. The system of claim 15, wherein the first facility and second facility are co-located.

18. The system of claim 15, wherein the first facility comprises at least two non-co-located transmission sites.

19. The system of claim 15, wherein the mobile device comprises a TV receiver.

20. The system of claim 15, wherein the mobile device is affixable to a vehicle.

21. The system of claim 15, wherein the mobile device is transportable by a pedestrian user.

22. The system of claim 15, wherein the broadcast transmitter and receiver are both configured for a short-range wireless connection.

23. The system of claim 22, wherein the short-range wireless connection comprises an IEEE 802.11 connection.

24. A computer software product embodied in a non-transitory computer-readable physical medium, comprising coded instructions for executing a computer process in a digital processor, which computer process manages providing interactive services to a mobile device, the computer process comprising:
    managing transmitting programming over-the-air to a mobile device by a first facility in communication with a service provider, wherein the service provider can be notified of intermittent loss of reception of information;
    managing receiving from the mobile device by a second facility comprising a first wireless access point, wherein the first wireless access point provides audio-visual programming storage and replay function in communication with the service provider, first information comprising location data of the mobile device, wherein the reception of the first information occurs during sporadic intervals when the mobile device is within communication range of the first wireless access point without scheduling the reception through a prior communications session;
    managing receiving from the mobile device by a third facility comprising a second wireless access point the first information upon notification by the service provider of intermittent loss of reception of information such that partially completed information received through the second facility can be completely received through the third facility; and
    managing transmitting to the mobile device by the second facility content specific to the mobile device, wherein the content comprises a program guide based on the location of the mobile device and a history of program information delivered to the service provider, wherein the transmission of the content occurs during sporadic transmission intervals when the mobile device is within communication range of the first wireless access point without scheduling the reception through a prior communications session or making the transmission dependent on an explicit request from the mobile device.

25. A method of providing interactive services to a mobile device, comprising:
    receiving programming over-the-air to a mobile device from a first facility in communication with a service provider, wherein the service provider can be notified of intermittent loss of reception of information;
    transmitting by the mobile device to a second facility comprising a first wireless access point, wherein the first wireless access point provides audio-visual programming storage and replay function in communication with the service provider, first information comprising location data of the mobile device, wherein the transmission of the first information occurs during sporadic intervals when the mobile device is within communication range of the first wireless access point without scheduling the reception through a prior communications session;
    transmitting by the mobile device to a third facility comprising a second wireless access point the first information upon notification by the service provider of intermittent loss of reception of information such that partially completed information received through the second facility can be completely received through the third facility; and
    receiving by the mobile device from the second facility content specific to the mobile device, wherein the content comprises a program guide based on the location of the mobile device and a history of program information delivered to the service provider, wherein the reception of the content occurs during sporadic intervals when the mobile device is within communication range of the first wireless access point without scheduling the reception through a prior communications session or making the reception dependent on an explicit request from the mobile device.

26. The method of claim 25, wherein the mobile device is regularly returned to within connection range of the wireless access point after regularly being outside connection range.

27. The method of claim 25, wherein a user of the mobile device maintains the wireless access point.

28. The method of claim 25, wherein the transmitting is responsive to a request received by the mobile device from a facility selected from the group comprising the first facility and the second facility.

29. The method of claim 25, wherein the mobile device is transported from place to place by a vehicle.

30. The method of claim 25, wherein a pedestrian user transports the mobile device from place to place.

31. The method of claim 25, wherein the wireless access point supports a short-range wireless connection.

32. The method of claim 31, wherein the short-range wireless connection supports an IEEE 802.11 connection.

* * * * *